Nov. 29, 1932. R. K. CADWELL 1,889,735
AUTO BRAKE TESTING MACHINE
Filed Oct. 7, 1927 3 Sheets-Sheet 2
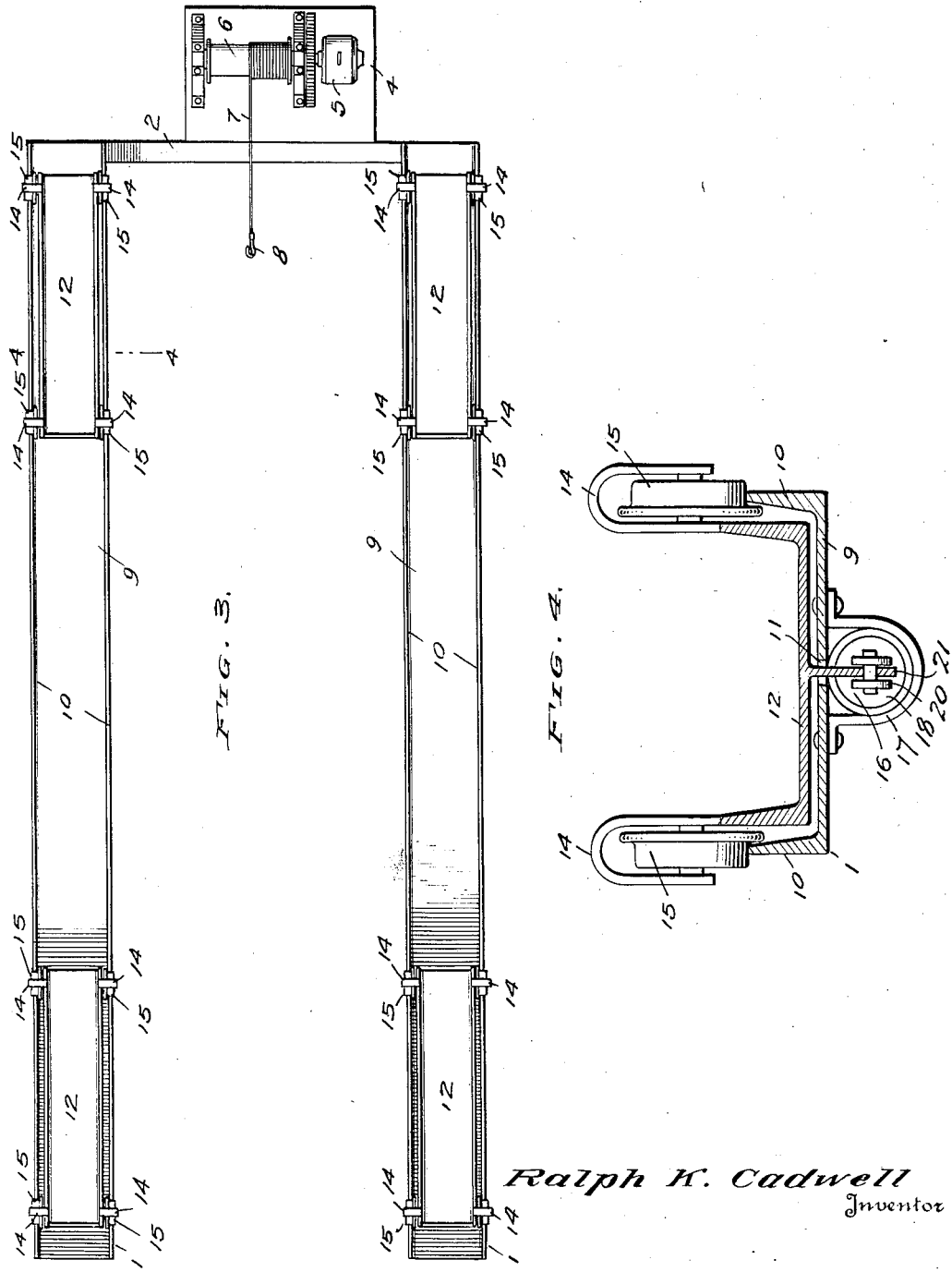
Ralph K. Cadwell
Inventor
By C. A. Snow & Co.
Attorneys.

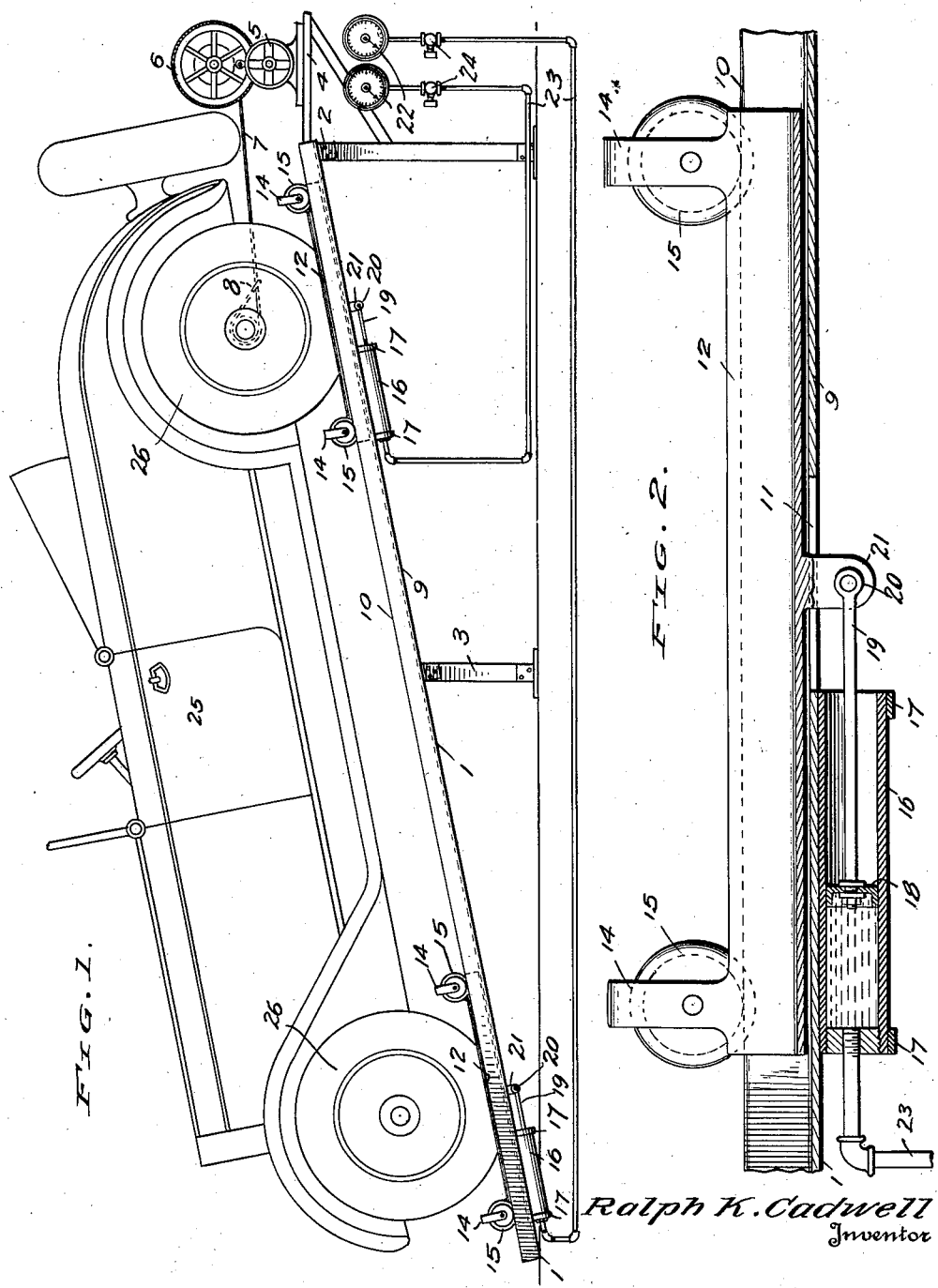

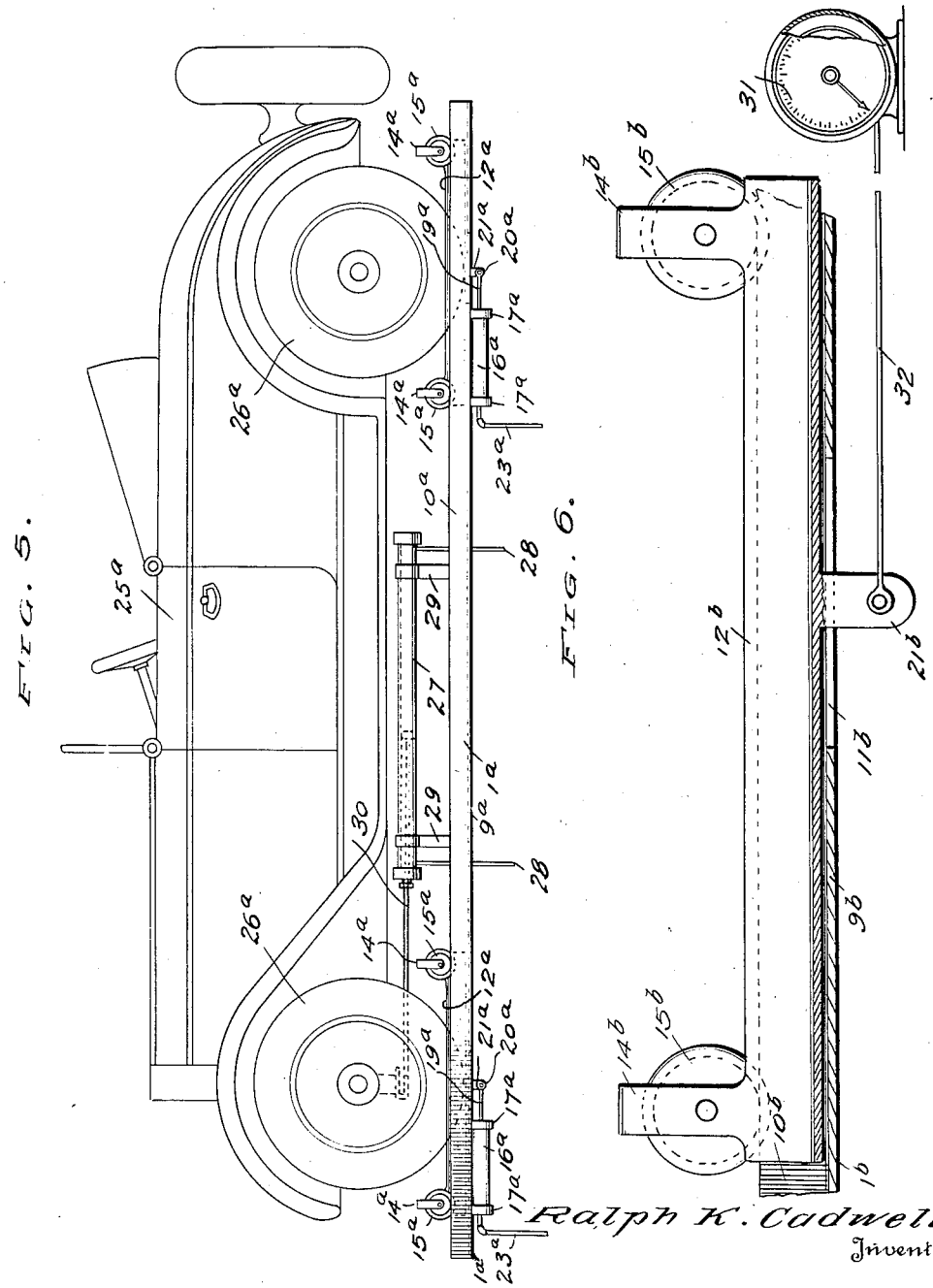

Patented Nov. 29, 1932

1,889,735

UNITED STATES PATENT OFFICE

RALPH K. CADWELL, OF GLENDALE, CALIFORNIA, ASSIGNOR TO CADWELL-BAIRD IRON WORKS, A COPARTNERSHIP, OF LOS ANGELES, CALIFORNIA

AUTO BRAKE TESTING MACHINE

Application filed October 7, 1927. Serial No. 224,681.

This invention aims to provide a novel means for testing the brakes of a motor-propelled vehicle.

It is an object of the invention to provide a novel form of brake testing machine and a new method of testing the brakes of a vehicle. In the invention I have provided a relatively stationary support having thereon a complement of wheel receiving members or carriages and means disposed between the carriages and the support tending to resist the movement of the carriages relative to the support and being capable of indicating or measuring the pressure exerted on said carriages against which the resistance means reacts. The vehicle is placed with its wheels resting on the carriages, the brakes of the vehicle are then set or put on to a desired degree, after which pressure is exerted against the chassis of the vehicle so as to produce a force tending to move the vehicle relative to the support. This pressure tending toward movement of the vehicle, is transmitted to and divided between the separate carriages in proportion to the gripping or retarding value of the brake associated with each respective wheel. The method of operation forming part of the invention differs from all known brake testing devices in that the test is accomplished without substantial rotation of the wheels of the vehicle.

It is within the province of the disclosure to improve generally and to enhance the utility of devices of that type to which the invention appertains.

With the above and other objects in view which will appear as the description proceeds, the invention is practised in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention;

Figure 2 is a fragmental longitudinal section of one of the shoes and attendant parts;

Figure 3 is a top plan of the device depicted in Figure 1;

Figure 4 is a cross section on the line 4—4 of Figure 3;

Figure 5 is an elevation showing a modification; and

Figure 6 is a view similar to Figure 2 but showing a further modification.

Referring to Figures 1, 2, 3 and 4, the device is disclosed as including a supporting structure comprising channel-shaped tracks 1, connected by an end frame 2, the frame 2 and intermediate props 3 serving to hold the tracks 1 at an incline, as delineated in Figure 1, these props forming a means for producing forces tending to cause a relative movement between the vehicle to be tested and the supporting structure. The end frame 2 carries a table 4 on which is mounted a motor 5 connected to a winch 6, a line 7 being wound around the winch and being provided with a connection 8.

Each track 1 includes a base 9 and side flanges 10. The base 9 has openings 11. Channel shaped shoes 12 are located within the tracks 1 and have upstanding hangers 14 on which are journaled wheels 15 adapted to move along the edges of the side flanges 10 of the tracks 1. Fluid pressure cylinders 16 are provided and are adapted to contain any kind of a fluid, either liquid or gas. The cylinders 16 are secured at 17 to the bases 9 of the tracks 1. Pistons 18 operate in the cylinders 16 and the rods 19 of the pistons are connected at 20 to ears 21 on the shoes 12, the ears being movable in the openings 11 of the tracks. Pressure gages 22 are connected by pipes 23 with the cylinders 16, the pressure gages being illustrative of any sort of indicating means. In the pipes 23 are interposed valves 24 under the control of an operator.

The numeral 25 designates an automobile, the wheels of which are shown at 26.

In practical operation, the connection 8 is made fast to the rear axle of the automobile 25, the motor 5 is put into operation to drive the winch 6, and winch reels in the line 7, and the automobile is towed up the incline tracks 1 until each of the wheels 26 rests on one of the shoes 12. The brakes on the automobile are set, and the line 7 is detached from the vehicle, or is slacked away, so that the vehicle can gravitate down the tracks 1.

If the vehicle wheels 26 could roll without friction over the shoes 12, the shoes would remain stationary. If the wheels 26 had a perfect grip on the shoes 12, the shoes would move as far as the wheels moved. Between these theoretical limits, and as a matter of practice, the amount that each shoe 12 moves, will depend upon the drag that the vehicle brake is putting on the corresponding wheel. Each shoe 12, therefore, will move somewhat, with the corresponding wheel 26. When the shoe 12 moves, the rod 19 operates the piston 18, and pressure is created in the cylinder 16, which serves as a means for resisting or reacting against forces tending to move its respective shoe or carriages 12, the pressure being transmitted through the pipes 23 to the several pressure gages 22. By obtaining a reading on each of the pressure gages 22, the operator can note the relative efficiency of the several brakes, and the relative efficiency of each brake with respect to the other brakes.

In Figure 5, parts hereinbefore described have been designated by numerals previously used, with the suffix "a". In this form of the invention, the tracks 1a are level, instead of being inclined as shown in Figure 1. The automobile 25a is moved by means of a piston rod 30 which is connected to one of the axles of the vehicle, the piston rod being connected to a piston which moves in a power cylinder 27 anchored at 29, the supply and exhaust pipes for the cylinder being shown at 28. The modification consists merely in the means for producing a force or forces tending to produce a relative movement between said automobile and the supporting structure. In Figure 5, the means for moving the automobile is the cylinder 27 and attendant parts, whereas in Figure 1, the means for moving the automobile is the declivity.

It is not necessary that pressure gages, such as the parts 22, be employed. The indicating means may consist of a spring balance 31, as shown in Figure 6, the spring balance 31 being united by a connection 32 with the ear 21b on the carriage 12b. In Figure 6, parts hereinbefore described have been designated by numerals previously used, with the suffix "b".

In simple description, the invention may be said to consist of an apparatus and the novel method employed in the use of the apparatus. The method of testing the brakes of a vehicle by use of a device embodying the mechanical elements herein disclosed consists of actuating the brakes, applying means to the wheels in a manner to resist bodily movement of the vehicle, producing an external force tending to produce a bodily movement of said vehicle relative to a supporting structure on which said means held, and measuring the proportionate reaction of each resisting means against the force tending to bodily move the vehicle. Although the invention is disclosed in simple form, it is recognized that various changes may be made therein without departing from the precepts of the invention, therefore, it is to be limited in scope only by the following claims.

What is claimed is:—

1. In an apparatus for testing the brakes of a vehicle, a movable wheel supporting member for supporting a wheel of a vehicle brought to rest thereon; means for supporting said member; controllable means independent of the vehicle and engageable therewith for starting the vehicle from rest with set brakes and in the direction of movement of said movable wheel supporting member; means for yieldingly resisting movement of said movable member when the vehicle is moved, and means cooperating with said resisting means for measuring the reaction of the movable member against the translational force imparted to it by the vehicle wheel.

2. In a device for testing brakes of a vehicle: a structure for supporting the vehicle and having a movable member on which the wheel of a vehicle may be brought to rest; controllable means independent of the vehicle and engageable therewith for applying to said vehicle a force operative to move said vehicle from rest and in the direction of movement of said movable member; and means for measuring the reaction of said movable member against the translational forces imparted to it by said wheel.

3. In a device for testing the brakes of a vehicle: a plurality of movable wheel supporting members arranged to support the respective wheels of a vehicle brought to rest thereon; means for supporting said members; controllable means independent of the vehicle and engageable therewith for starting said vehicle from rest and in the direction of movement of said movable members; means operative in conjunction with said movable members for yieldably resisting movement of said movable members under influence of forces imparted thereto by said wheels; and an indicating device associated with each of said resisting means for showing the relative reaction with which each movable member is held against movement under the translational forces imparted to them by said wheels.

4. In a device for testing the brakes of a vehicle: a structure for supporting the vehicle and having movable members on which respectively the wheels of the vehicle are brought to rest; controllable means associated with said structure for applying to said vehicle a force operative to move said vehicle from rest and in a direction of movement of said movable members; means operative in conjunction with said movable members for yieldably resisting movement of said movable members under influence of forces imparted thereto by said wheels; and indicating devices cooperating with said resisting means for showing the relative reaction with which each movable member is held against movement under the translational forces imparted to them by said wheels.

5. In a device for testing the brakes of a vehicle: a structure for supporting the vehicle and having movable members on which respectively the wheels of the vehicle are brought to rest; a controllable force exerting element independent of the vehicle and having a movable bar equipped with means adapted to engage said vehicle so as to impart thereto a force to move said vehicle from rest and in a direction of movement of said movable members; means operative in conjunction with said movable members for yieldably resisting movement of said movable members under influence of forces imparted thereto by said wheels; and indicating means cooperating with said resisting means for showing the relative reaction with which each movable member is held against movement under the translational forces imparted to them by said wheels.

6. In a device for testing the brakes of a vehicle: a plurality of movable wheel supporting members arranged to support the respective wheels of a vehicle brought to rest thereon; means for supporting said members; controllable means at one end of said structure engageable with the vehicle for starting the vehicle from rest to cause a relative movement between said vehicle and said supporting structure; means operative in conjunction with said movable members for yieldably resisting movement of said movable members under influence of translational forces imparted thereto by said wheels; and indicating devices cooperating with said resisting means for showing the relative reaction with which each movable member is held against movement under the translational forces imparted to them by said wheels.

7. In a device for testing the brakes of a vehicle: a supporting structure; movable members mounted on said supporting structure adapted to receive the wheels of the vehicle brought to rest thereon; controllable means independent of the vehicle and engageable therewith adapted to exert a force on said vehicle to move it bodily from rest; means operative in conjunction with said movable members for yieldably resisting movement of said movable members; and an indicating device associated with each of said resisting means for showing the relative reaction with which each movable member is held against movement under translational forces imparted thereto by said wheels.

8. A device for testing the brakes of a vehicle, including: a supporting structure; a movable member on said supporting structure on which a wheel of the vehicle may be brought to rest; controllable means independent of the vehicle and engageable therewith for producing a force to move said vehicle from rest and in the direction of movement of said movable member; and means for measuring the reaction of said movable member against the translational force imparted thereto by said wheel.

9. A device for testing the brakes of a vehicle, including: a supporting structure; a movable member on said supporting structure on which a wheel of the vehicle may be brought to rest; controllable means independent of the vehicle and engageable therewith for producing a force to move said vehicle from rest and in the direction of movement of said movable member; and yieldable means for resisting movement of said movable member, having means for measuring its reaction against movement of said movable member under translational force imparted thereto by said wheel.

10. A device for testing the brakes of a vehicle, including: a supporting structure; a movable member on said supporting structure on which a wheel of the vehicle is brought to rest; controllable power means independent of the vehicle and equipped with means engageable with said vehicle so as to impart thereto a force to move said vehicle from rest and in the direction of movement of said movable member; yieldable means operative in conjunction with said movable member for resisting movement of said movable member under influence of force imparted thereto by said wheel; and an indicating device cooperating with said resisting means for showing the reaction with which said movable member is held against movement.

11. In an apparatus for testing the brakes of a vehicle: movable wheel supporting members for supporting the respective wheels of a vehicle brought to rest thereon; means for supporting said members; controllable means independent of the vehicle and engageable therewith for moving the vehicle from rest with set brakes and in the direction of movement of said movable wheel supporting members; fluid containing cylinders; pressure gauges connected with said cylinders and pistons in the cylinders operatively connected with said wheel supporting members.

12. In an apparatus for testing the brakes of an automobile: a pair of spaced tracks; wheeled carriages thereon, each adapted to support a wheel of the automobile; means yieldingly resisting movement of said carriages in one direction; an indicating device operatively connected with each carriage for independently indicating the brake resistance of each wheel; each of said indicating devices comprising elements mounted for relative movement; and a controllable power device independent of the vehicle having means for connecting it with said vehicle whereby the vehicle may be moved from rest with its brakes set, thereby causing all of said carriages to be relatively moved because of the frictional engagement of the wheels therewith, whereby said indicating devices will be simultaneously actuated to independently register the brake resistance of their respective wheel brakes.

13. In a device for testing the brakes of a vehicle: a supporting structure having a pair of longitudinally positioned channels; wheel receiving members movably carried in said channels; resisting means operative between said supporting structure and said wheels receiving members for tending to hold said wheel receiving members in definite positions in said channels; anchored cylinder-piston means engaging said vehicle in a manner to move said vehicle relative to said supporting structure; and an indicating device with each of said resisting means for showing the forces tending to displace said wheel receiving members when said cylinder-piston means is actuated.

14. The method of testing the brake of a wheeled vehicle which comprises bringing the vehicle wheel to rest upon a restrainedly movable supporting surface with the brake applied, then applying an external force to said vehicle tending to move it bodily and measuring the force of restraint of said supporting surface.

In testimony that I claim the foregoing as my own, I have hereto affixed my signature.

RALPH K. CADWELL.